United States Patent [19]
Nordman

[11] Patent Number: 6,061,346
[45] Date of Patent: May 9, 2000

[54] SECURE ACCESS METHOD, AND ASSOCIATED APPARATUS, FOR ACCESSING A PRIVATE IP NETWORK

[75] Inventor: Mikael Nordman, Sollentuna, Sweden

[73] Assignee: Telefonaktiebolaget LM Ericsson (publ), Stockholm, Sweden

[21] Appl. No.: 08/784,152

[22] Filed: Jan. 17, 1997

[51] Int. Cl.$^7$ ................................................ H04L 12/66
[52] U.S. Cl. .............................................................. 370/352
[58] Field of Search ..................................... 370/351, 310, 370/328, 338, 392, 352–356; 395/200.47, 200.48, 900.54; 455/422

[56] References Cited

U.S. PATENT DOCUMENTS

| | | | |
|---|---|---|---|
| 5,317,568 | 5/1994 | Bixby et al. | 370/401 |
| 5,559,800 | 9/1996 | Mousseau et al. | 370/401 |
| 5,812,552 | 9/1998 | Arora et al. | 370/401 |
| 5,828,844 | 10/1998 | Civanlar et al. | 395/200.58 |

FOREIGN PATENT DOCUMENTS

| | | |
|---|---|---|
| 0 483 547 A1 | 5/1992 | European Pat. Off. . |
| WO 94/11849 | 5/1994 | WIPO . |
| PCT/SE98/00022 | 4/1998 | WIPO . |

OTHER PUBLICATIONS

*Proposed Operation of GSM Packet Radio Networks* by Jari Hämäläinen and Hannu H. Kari, XP 002020137; IEEE Int'l. Symposium on Personal, Indoor & Mobile Radio Communications, vol. 1, Sep. 27, 1995; pp. 372–377.

*GPRS, General Packet Radio Service* by Sven Åkesson, XP 000645966; Int'l. Conf. on Universal Personal Communications, Nov. 6, 1995; pp. 640–643.

Nomadic Access to Information Services by GSM Phone by Markku Kylänpää, Olli Pihlajamaa and Martin Bergenwall, XP 002037372; Computer & Graphics, vol. 20, No. 5, Sep. 1, 1996; pp. 651–658.

IP Addressing and Routing in a Local Wireless Network by Danny Cohen, Jonathan B. Postel and Raphael Rom; IEEE; XP002020138; One World Through Communications, Florence, May 4–8, 1992, vol. 2; pp. 626–632.

*Primary Examiner*—Ajit Patel
*Attorney, Agent, or Firm*—Jenkens & Gilchrist, P.C.

[57] ABSTRACT

A method, and associated apparatus, for accessing a private IP network with a wireless host by way of a wireless access network. Once authenticated and permitted access to the private IP network, the wireless host becomes a virtual host of the private IP network. A wireless host identifier (WHI) is used to identify the wireless host. Permission to communicate by way of wireless access network is confirmed by an authentication procedure. The WHI is thereafter provided to the private IP network. If the WHI is of a selected value, permission to access the private IP network is granted. An IP address used to address data to the wireless host is allocated by the private IP network once access to the private IP network is granted.

24 Claims, 2 Drawing Sheets

SECURE ACCESS METHOD, AND ASSOCIATED APPARATUS, FOR ACCESSING A PRIVATE IP NETWORK

The present invention relates generally to communications between a wireless host and a network-located device. More particularly, the present invention relates to a method, and associated apparatus, for permitting the wireless host access to a private data communication network, such as a private IP network.

In an embodiment in which the private data communication network is formed of a private IP network, the private IP network is coupled to a wireless access network formed of the network infrastructure of a radio communication system, such as a cellular communication system. Once the wireless host is permitted access to the private IP network, an IP address is assigned to the wireless host by the private IP network. Information accessed at the private IP network is addressed to the wireless host using the IP address assigned by the private IP network.

A request by the wireless host to access the private IP network by the wireless host is transmitted first to the wireless access network. An authentication procedure is performed to confirm that the wireless host is permitted to communicate by way of the wireless access network. If the wireless host is authenticated, a wireless host identity (WHI), which identifies the wireless host is forwarded to the private IP network. The wireless host is permitted to access the private IP network if the WHI identifies a wireless host permitted to access the private IP network. The private IP network then allocates an IP address to the wireless host. The IP address is used to address data to the wireless host.

A simple and efficient manner by which to access a private IP, or other data communication, network is provided. A WHI is used to identify the wireless host in the wireless access network and at the private IP network. When the WHI is stored at the wireless access network, and does not have to be sent to the wireless access network infrastructure over an air interface. And, if the wireless host is permitted to access the private IP network, an IP address is assigned to the wireless host by the private IP network. The IP address can be dynamically allocated to the wireless host, and a separate IP address need not be permanently allocated to the wireless host.

BACKGROUND OF THE INVENTION

Advancements in communication technologies have permitted significant improvements in the manners by which data can be communicated between a sending and a receiving station.

For instance, in radio communications, advancements in digital communication techniques has permitted the introduction of, and popularization of, new types of communication systems. For example, cellular communication systems which utilize digital communication technologies have been installed in many areas and are widely utilized.

Advancements in communication technologies have also facilitated the decentralization of computer systems. Processing devices can be distributed at separate locations and connected together by network connections. Network connections between distributed processing devices and communications therebetween have precipitated, for instance, the advent of and wide availability of IP networks, such as the Internet. Other private data communication networks have similarly been formed.

The advancements in communication technologies have also permitted the merging of radio and network-connected communication systems. For instance, it is possible for a terminal device, such as a portable computer, to be coupled by way of a radio link to network infrastructure of a radio communication system and, in turn, by way of a network connection to an Internet-connected, network device. The terminal device forms a wireless host to the Internet-connected network device as a physical, such as a hard-wired, link is not formed with the terminal device.

A private IP network is formed of a group of network devices, connected together by way of network connections, but to which access to the network is limited. Increasing numbers of private IP networks are being created and access thereto by a wireless host is increasingly demanded. Increasing numbers of other data communication networks are being created and access thereto by a wireless host is increasingly demanded.

Because of the limited-access nature of a private network, there is a need to insure that the wireless host is authorized to access the private network. And, if the wireless host is authorized to access the private network, there is a corresponding need to insure that the wireless host properly receives an acceptable level of access to the private network. That is to say, the wireless host should be treated as a virtual host, given the level of access to the private network as that given to a host physically coupled to such network.

Because the coupling of a wireless host to a network device of a private data communication network includes a radio link, the wireless host must be identified by an address so that data can be communicated thereto. In some existing communication systems in which a wireless host is able to communicate with a network device, the address of the wireless host is dynamically allocated. That is to say, e.g., in an embodiment in which the private data communication network is formed of a private IP network, rather than assigning a permanent IP address to the wireless host, a temporary IP address is assigned to the host when data is to be communicated to the wireless host. IPv6 dynamic IP address allocation is exemplary of an allocation method by which dynamically to allocate IP addresses to wireless hosts. In such method, to provide a fixed identity for the wireless host, a DNS (Domain Name System) name is allocated. A DNS name is a symbolic name provided for wireless hosts and other devices connected to an IP network.

One manner by which a wireless host can access a private IP network is to utilize a dial-out connection from the wireless host to the private IP network. Once a switched connection is formed, the wireless host is identified with a password.

Another manner by which a wireless host is sometimes able to access the private IP network is through the use of an authenticated tunnel. The wireless host is connected to the private IP network by way of the authenticated tunnel, and the wireless host is authenticated at the private IP network with an identity and a password. Such a tunneling method is sometimes referred to as "layer two tunneling." A PPTP system developed by MicroSoft Corporation, an L2F system developed by Sysco Systems, and an L2TP system developed by IETF are related to tunneling PPP.

The existing manners by which a wireless host accesses a private IP, or other data communication, network requires significant amounts of protocol overhead. As in any bandwidth-limited communication system, protocol overhead is width-consumptive.

When the wireless host accesses the private network by way of the network infrastructure of a cellular communication system, portions of the network infrastructure function as a wireless access network. When, e.g., the private data communication network forms a private IP network, two IP addresses are required to permit communications between the wireless host and the private IP network. A first IP address is required at the wireless access network formed of the portion of the network infrastructure, and a second IP address is required at the private IP network. Thereby, the wireless host is required to belong to two networks, i.e., the access IP network and the private IP network.

As a result, two IP addresses must be allocated to the wireless host. If DNS is used in the two networks, it would also be necessary to allocate DNS names in both networks.

The layer two tunneling method requires formation of a protocol stack having three extra layers, the PPP layer, a layer two tunneling layer, and a basic IP layer. The protocol overhead resulting from such additional protocol layers is bandwidth-consumptive. Such a requirement is generally undesirable in a bandwidth-limited system.

Some wireless hosts are additionally capable of communicating packet data by way of circuit-switched as well as packet-switched connections. A GSM (Global System for Mobile communications) cellular communication system is exemplary of a cellular communication system which permits wireless hosts operable therein to communicate packet data by way of packet-switched and also circuit-switched connections. It would be advantageous to provide a manner by which to permit access of the wireless host to a private IP, or other data communication, network using the same access procedure irrespective of the type of data which is to be communicated therebetween.

In conventional manners by which to provide access of a wireless host to, e.g., a private IP network, dial-up connections are made directly to the private IP network. That connection may be made, for instance, to a remote access server of the private IP network. Telephonic charges associated with the dial-up connection can be significant. For instance, a long-distance toll might be charged to form the dial-up connection if an inter-LATA switched connection, or the like, is required between the network infrastructure of the cellular communication system and the private IP network. It would, of course, be desirable for the wireless host instead to be able to access a wireless access network as close as possible to the location at which the wireless host is positioned and thereafter to utilize IP transmission between the wireless access network and the private IP network.

A manner by which better to permit access of a wireless host to access a private data communication network to communicate packet data therebetween would be advantageous.

It is in light of this background information related to access of a wireless host and to a private IP network that the significant improvements of the present invention have evolved.

SUMMARY OF THE INVENTION

The present invention advantageously provides a method, and associated apparatus, for permitting a wireless host access to a private data communication network, such as a private IP network. The present invention further advantageously provides a method, and associated apparatus, once access is granted to the private network, for dynamically allocating a temporary address to the wireless host. The dynamically-allocated address is used to address data which is to be communicated to the wireless host.

In one aspect of the present invention, the wireless host is coupled by way of an air interface to the network infrastructure of a PLMN (Public Land Mobile Network), such as a GSM network. The PLMN is, in turn, coupled to a private IP network. The network infrastructure forms thereby a wireless access network. When the wireless host requests access to the private IP network, communications are first authenticated at the wireless access network formed of the network infrastructure of the PLMN. An authentication procedure is performed to confirm that communications are permitted by way of the wireless access network. If the authentication procedure confirms that such communications are permitted, a wireless host identity (WHI), previously stored at the wireless access network and which identifies the wireless host, is forwarded to the private IP network. The private IP network permits access to the wireless host if the wireless host identity provided thereto corresponds with the identity of a wireless host permitted to access the private IP network. An IP address is allocated to the wireless host by the private IP network. Such IP address is used to address data communicated to the wireless host. The IP address can be a dynamically-allocated address, used for a selected period to identify temporarily the wireless host.

Thereby, the wireless host is not required to have a separate IP identity to access a wireless access network. Instead, a wireless host identity stored at the wireless access network formed of the infrastructure of the PLMN is used to identify the wireless host at the private IP network. The wireless host identity may be provided e.g., as subscription data in the wireless access network. The wireless host identity is selected, e.g., by the operator of the private IP network, and the wireless host identity is provided to, and stored at, the network infrastructure of the PLMN pursuant to agreement between the operator of the private IP network and the operator of the PLMN.

Once provided access to the private IP network, an IP address for the wireless host is provided by the private IP network and not the PLMN. The wireless host is permitted to become a virtual host of the private IP network thus ensuring that the user and host environment, including security and firewalls, of the private IP network, shall similarly apply to the wireless host. IP tunneling is used between the PLMN and the private IP network. The IP tunnel can be secured by either by an authentication process or by arranging for secure transmissions by arrangements between the operators of the PLMN and the private IP network. The tunnel authentication keys maybe stored together with the WHI at the HLR, the SIM card, or at the wireless host to provide secure transmission of the wireless host identity as well as other data. The tunneling, however, does not extend to the air interface. Instead, air-interface-specific, transmission protocols are used to communicate datagrams between the wireless host and the network infrastructure of the PLMN.

In these and other aspects, therefore, a secured-access method, and associated apparatus for implementing the method, accesses a private data communication network by a remote communication station. Once provided access, data is communicated between the private data communication network and the remote communication station. The private data communication network is coupled to the network infrastructure of the radio communication system. A remote communication station identity is stored at the network infrastructure of the radio communication system. A registration request is generated by the remote communication station for requesting registration of the remote communication station to access the network infrastructure to permit the communication of data therethrough. The registration request is detected at the network infrastructure. The remote communication station is authenticated to confirm authorization of the remote communication station to communicate by way of the network infrastructure. A network-access request is forwarded to the private data communication network if the remote communication station is authenticated wherein the remote communication station is identified by the remote communication station identity. A determination is made, responsive to the network-access request, whether the remote communication station is permitted to access the private data communication network. And, the remote communication station is permitted to access the private data communication network if the remote communication station is determined to be permitted to access the private network. Subsequent to grant of permission to access the private data communication network, an address, such as a temporary address, can be assigned to the wireless host.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
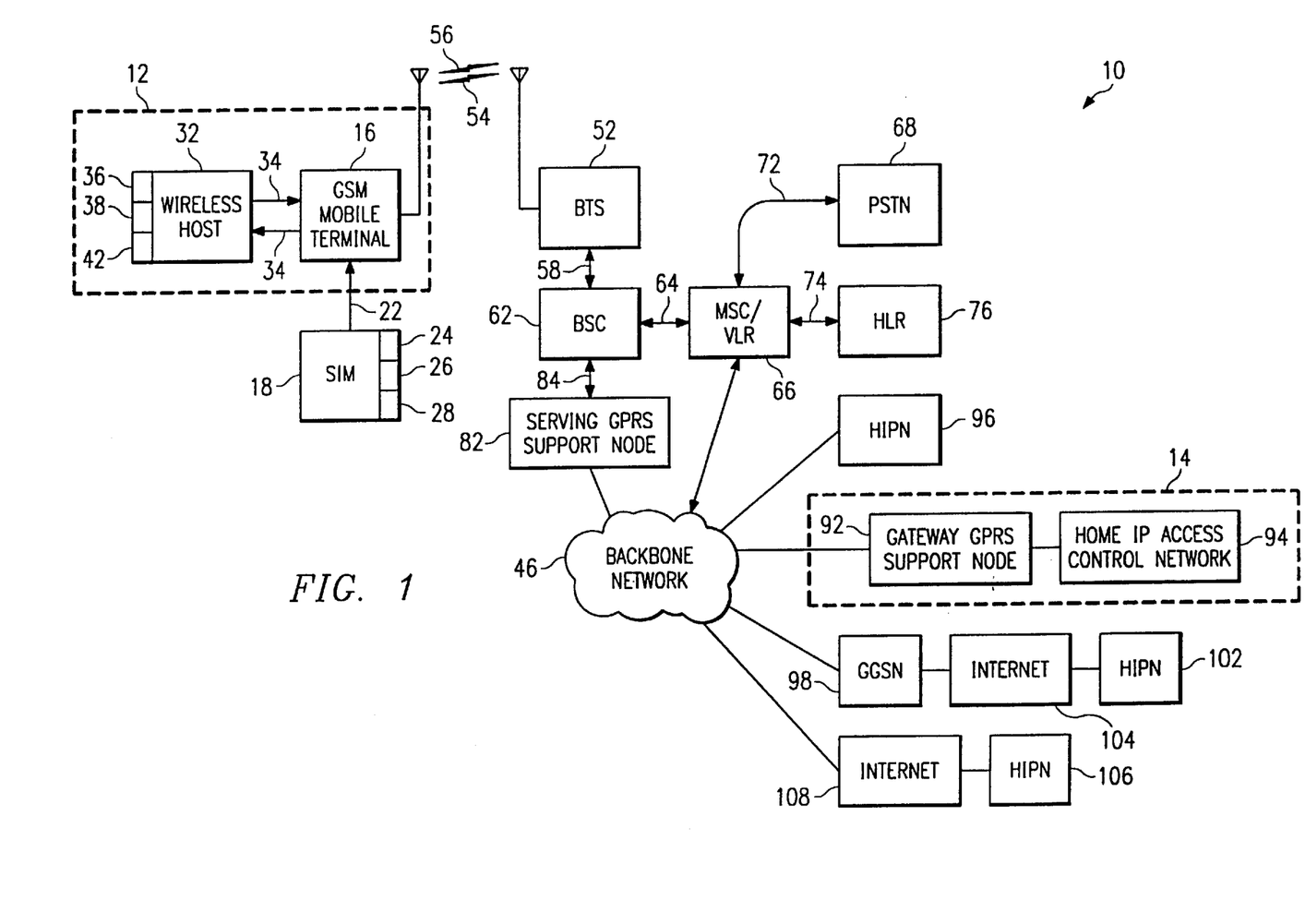
FIG. 1 illustrates a functional block diagram of a communication system in which an embodiment of the present invention is operable.

Referring first to FIG. 1, a communication system, shown generally at 10, permits the communication of data between a remote communication station 12 and a private IP network 14. The private IP network 14 here forms a private intranet to which access is selectively permitted. When the remote communication station 12 is permitted access to the private IP network 14, data can be communicated therebetween. In one embodiment, packet data is communicated between the remote communication station 12 and the private IP network 14. While a private IP network is shown in the exemplary embodiment illustrated in the figure, in other embodiments, access to other types of private data communication networks can analogously be effectuated through operation of an embodiment of the present invention. Therefore, while the following description shall be described with respect to a private IP network 14, it should be understood that the present invention is also operable to permit access to other data communication networks.

In the exemplary embodiment illustrated in the figure, the communication system 10 is formed of a GSM (Global System for Mobile communications) cellular communication system of which the network infrastructure thereof forms a wireless access network to which the private IP network 14 is coupled. In other embodiments, the communication system 10 is alternately formed of other structure.

The radio communication station 10 includes a radio transceiver, here a GSM mobile terminal 16. The mobile terminal 16 includes a SIM (Subscriber Identity Module) card 18 which is inserted into, or is otherwise connected, here indicated by the lines 22, to the mobile terminal 16.

The SIM card 18 includes a storage location 24 for storing authentication information, in conventional manner. The SIM card 18 further includes a storage location 26 for storing the address of the private IP network 14. In one embodiment of the present invention, the SIM card further includes a storage location 28 for storing a WHI (Wireless Host Identifier). Other subscriber data can additionally be stored at other storage locations of the SIM card 18.

The mobile terminal 16 is coupled to a wireless host 32, here by way of lines 34. The wireless 32, in one embodiment, forms a portable computer capable of receiving data communicated thereto by a network device of the private IP network 14. The wireless host 32 may alternately be coupled to the mobile terminal 16 by a contactless coupler, e.g., an infrared coupler. In one embodiment of the present invention, the wireless host 32 includes storage locations 36, 38, and 42 for storing data similar to that stored at the storage locations 24, 26, and 28. Namely, in such an embodiment, authentication information, the address of the private IP address 14, and the value of the WHI are stored at the storage locations 36–42, respectively. In the exemplary embodiment illustrated in the figure, such information is redundantly stored at the storage locations of both the SIM card 18 and the wireless host 32. In other embodiments, merely the authentication information is stored at one of the storage locations 24 or 36.

The network infrastructure of the communication system 10 forms a wireless access network which is coupled to the private IP network 14 by way of a backbone network 46. The wireless access network formed of the network infrastructure of the GSM system is here shown to include a BTS (Base Transceiver Station) 52. The BTS 52 is operable to generate downlink signals 54 and to receive uplink signals 56 upon an air interface formed of radio links between the remote communication station and the BTS 52.

In the embodiment in which portions of the communication system 10 are formed of a structure of a GSM communication system, such structure, as well as the air interface formed between the remote communication station 12 and the BTS 52 are defined by the specification standards of the GSM system.

Groups of BTSs, of which a single BTS 52 is shown in the figure, are coupled by way of lines 58 to a BSC (Base Station Controller) 62. The BSC 62 is operable, inter alia, to control operation of the BTSs coupled thereto. The BSC 62 is further coupled, here by way of lines 64, to a MSC/VLR (Mobile Switching Center/Visited Location Register) 66. The MSC/VLR 66 is operable in conventional manner to form appropriate connections to form a communication path between the BSC 62 and a PSTN (Public-Switched Telephonic Network) 68 by way of lines 72.

The MSC/VLR 66 is further coupled, by way of lines 74, to an HLR (Home Location Register) 76. The HLR 76 includes an authentication center (not separately shown) at which, inter alia, an IMSI (International Mobile Subscriber Identity) and a value of a pseudo-random number are stored. Such values are utilized during authentication procedures used to confirm the authenticity of the remote communication station.

In an embodiment of the present invention, a value of WHI associated with the wireless host 32 is also stored at the HLR 76. And, in another embodiment of the present invention, an address associated with the private IP network 14 is also stored at the HLR 76.

Both the BSC 62 and the HLR 76 are further coupled to a SGSN (Serving GPRS Support Node) 82. The BSC 62 is coupled to the SGSN 82 by way of lines 84. And, the HLR 76 is coupled to the SGSN 82 by way of lines 86. The SGSN 82 is further coupled to the backbone network 46 by way of lines 88. Thereby, the SGSN 82 is coupled to the private IP network 14.

The private IP network 14 here forms an HIPN (Home Intelligent Peripheral Network), here shown to include a GGSN (Gateway GPRS Support Node) 92 and a home IP access control network 94. Additional details of the HIPN forming the private IP network 14 shall be described below with respect to FIG. 3.

The backbone network 46 is further coupled to additional IP networks, such as the IP network 96.

The backbone network 46 is further shown to be coupled by way of a GGSN 98 to another IP network forming another HIPN, here HIPN 102, by way of an Internet connection 104. And, the backbone network 46 is also coupled to an additional private IP network, forming an additional HIPN 106 by way of an Internet connection 108. Such additional HIPNs 96, 102, and 106 are exemplary and are shown to illustrate manners by which private IP networks can be coupled to a wireless access network such as the network infrastructure of the GSM system shown in the figure.

During operation, when an operator of the wireless host 32 desires to access the private IP network 14, appropriate commands are generated at the wireless host to initiate a request for access to the private IP network 14. Signals indicative of such request are provided to the mobile terminal 16, and the mobile terminal 16 generates a request over the air interface as an uplink signal 56 communicated to the BTS 52. In a GSM communication system, an attach procedure is initiated. The BTS 52 forwards the request through the BSC 62 to the MSC/VLR 66.

The IMSI and pseudo-random number of values are retrieved from the HLR 76 and an authentication procedure is carried out. While details of the authentication procedure carried out in a GSM communication system can be found in the specification standards of the GSM system, in general, the authentication procedure authenticates, i.e., confirms, that the mobile terminal 16 is permitted to communicate by way of the network infrastructure forming the wireless access network. Once the authentication procedure is successfully completed, i.e., the mobile terminal 16 is confirmed to be an authentic terminal which is permitted to communicate by way of the wireless access network formed of the network infrastructure, a value of the WHI associated with the wireless host is forwarded to the private IP network 14.

In one embodiment, when the WHI is stored at the HLR 76, the value stored thereat is provided by way of the line 86 to the SGSN 82, through the backbone 46 and to the private IP network 14. The WHI stored at the HLR is forwarded to the SGSN 82 if the authentication procedure confirms the authenticity of the mobile terminal 16. Thereby, the value of the WHI is authenticated by the authentication procedure performed by the wireless access network. Storage of the WHI at the HLR 76, or at another portion of the wireless access network, requires an agreement between an operator of the private IP network 14 and the operator of the wireless access network for the secure storage of the value of the WHI at the wireless access network. A separate IP address or DNS (Domain Name Service) name is provided only at the private IP network 14, and not elsewhere. Thereby, because the IP address and DNS name is provided at the private IP network, the wireless host 32, when permitted access to the private IP network, becomes a virtual host of the network 14. The user and host environment of the network 14, including security and firewalls of the network apply also to the wireless host 32.

Access of the wireless host 32 to others of the networks, such as the HIPNs 96, 102, and 106, can analogously be effectuated.

In one embodiment, authenticated IP tunneling is also performed between the SGSN 82 and the GGSN 92 over the backbone network 46 to ensure secure transmission of the WHI, and other data, between the private IP network 14 and the wireless access network formed of the network infrastructure. Such authenticated tunneling is performed as the backbone network 46 might be shared by many different operators and security of the backbone can not be assured. For instance, if the HIPN 106 is to be accessed, data is routed by way of a public Internet 108. The authenticated IP tunneling is performed to authenticate traffic, i.e., communication of data, between the SGSN 82 and the GGSN 92. Authenticating the traffic routed over the backbone ensures the validity of the value of the WHI when the value is received at the GGSN 92. When, e.g., the HIPN 102 is instead to be accessed, the transmission over the Internet 104 similarly is authenticated by an authentication procedure.

In one embodiment, the GGSN 92 includes an access control mechanism to ensure that only values of wanted-WHIs are permitted to gain access to the private IP network. A list of wanted-WHIs is stored at the access control mechanism of the GGSN 92. And, a WHI authentication procedure may further be performed to increase further the security level and minimize the possibility of erroneous access to the private IP network responsive to WHI administration mistakes. While not separately shown in FIG. 1, the SGSN 82 and the GGSN 92 are protected by firewalls positioned towards the backbone network 46.

Within the private IP network 14, standard, HIPN security procedures, such as e.g., firewalls and passwords, are used. Thereby, the wireless host 32, once access to the private IP network is permitted, is provided with the same environment and security level as any other host connected directly to the network 14.

Figure 2:
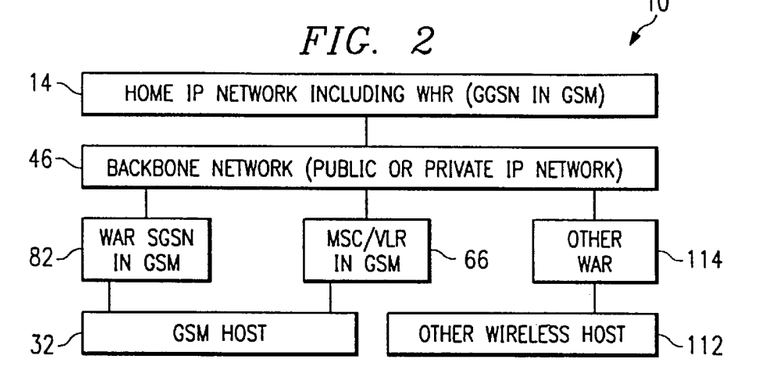
FIG. 2 illustrates a logical, functional block diagram illustrating the routing of data communicated between a wireless host and a private IP network.

FIG. 2 illustrates the logical arrangement of portions of the communication system 10 shown in FIG. 1. Again, during operation of an embodiment of the present invention, a wireless host, here the wireless host 32, is selectively permitted to access the private IP network, here again shown to form an HIPN, 14.

When the wireless host 32 is to gain access to the private IP network 14, the mobile terminal 16 generates an attach request to attach to the wireless access network formed of the network infrastructure of the GSM system. The attachment procedure is performed pursuant to the SGSN 82 when using packet-switched circuit connections. And, the attach procedure is performed pursuant to the MSC/VLR 66 when circuit-switched circuit connections are used.

During the attach procedure, the values of the IMSI, the WHI, and other associated subscriber data is downloaded from the HLR 76 to the appropriate one of the MSC/VLR 66 and SGSN 82. The other appropriate subscriber data includes the address of the private IP network 14. Addresses of additional private IP networks, such as the HIPN 96, 102, and 106 (shown in FIG. 1) may also be downloaded to permit alternate, or second-choice access to an alternate IP network. The HIPN address identifying the private IP network 14, in one embodiment, is the address of the GGSN, such as the GGSN 92 of the private IP network 14.

Thereafter, the mobile terminal 16 generates a "PDP routing context activation request" to the SGSN 82 or an access to the MSC/VLR 66, as appropriate. The access to the MSC/VLR 66 is performed, for instance, by placing a call originated at the mobile terminal. Alternatively, standardization of additional protocol over the air interface to explicitly indicate that the MSC/VLR should be accessed can be made.

Pursuant to the activation request to the SGSN 82 or the access to the MSC/VLR 66, an indication of which HIPN is to be accessed is further provided to the SGSN or MSC/VLR, as appropriate. The mobile terminal 16 indicates, for instance, that the private IP network identified by the HIPN address stored at the HLR is the address of the private IP network which is to be accessed. Alternatively, the mobile terminal 16 can itself provide the address of the private IP network which is to be accessed. Or, a default address can be used to identify the private IP network which is to be accessed.

The appropriate one of the SGSN 82 and the MSC/VLR 66 analyzes the value of the IMSI provided thereto and determines the address of the default, private IP network if the address is not otherwise provided thereto.

The appropriate one of the SGSN 82 and MSC/VLR 66 generates a "create PDP context" command which is forwarded, by way of the backbone network 46 to the GGSN 92, when the private IP network 14 is to be accessed, or another GGSN when another network is, instead, to be accessed. The "create PDP context" command includes the WHI of the wireless host, and such value is used as the host identity at the HIPN forming the private IP network 14.

FIG. 2 further illustrates a wireless host 112 which is connectable to another WAR (Wireless Access Router) 114 by way of a radio link. And, the WAR 114 is coupled to the backbone network 46. The wireless host 112 is exemplary of another device to which access might be permitted to the IP network 14.

Figure 3:
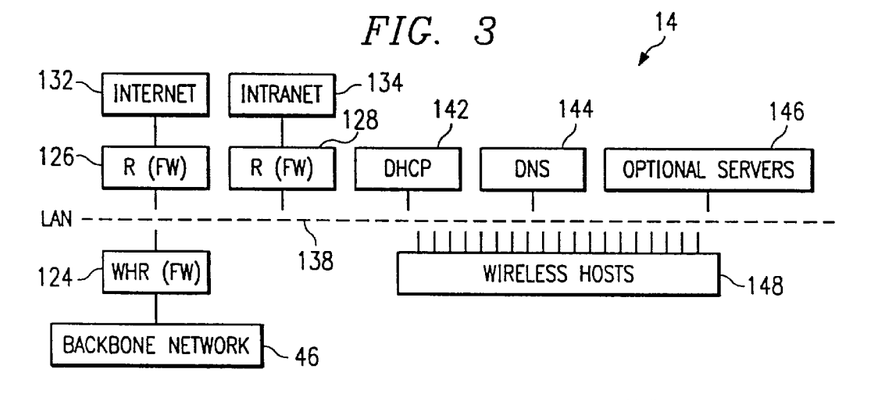
FIG. 3 illustrates a functional block diagram of a private IP network which includes an embodiment of the present invention for allocating an address by which to address data communicated to a wireless host.

FIG. 3 illustrates a logical model of the private IP network 14, formed of an HIPN, shown previously in FIGS. 1 and 2. The HIPN formed of the network 14 provides services and a user environment including the following: a DHCP (Dynamic Host Configuration Profile) service, a DNS (Domain Name Service) service, a news service, a mail service, a log-in service, an NTP service, a WWW (World Wide Web) service, other application servers, connection to an Internet, connections to intranets, connection to a backbone network, and firewalls at each interface to which connection is made to another network.

Access to a private IP network by the wireless host 32 provides vertical services and access to the home organization of a mobile terminal. In such a scenario, the private IP network is part of the private network of a service provider. A public IP network provides public Internet services. If, instead, a public IP network is accessed, the public IP network is situated at an Internet service provider at either a home or a visited, PLMN (Public Land Mobile Network), provided by its operator or a dedicated Internet service provider.

With reference, then, to FIG. 3, the HIPN forming the private IP network 14 is again shown to be coupled to the backbone network 46. A WHR (Wireless Host Router) 124 which also functions as a firewall is coupled to the backbone network 46. The WHR 124 is formed of a router having special support for selectively permitting a wireless host, such as the wireless host 32, to become a virtual host of the network. The network 14 includes other routers, here routers 126 and 128, which are connected to an Internet 132 and an intranet 134, respectively. The routers 124–128 are connected by way of a local area network (LAN) 138 to which a DHCP (Dynamic Host Configuration Profile) device 142 and a DNS (Domain Name Service) device 144 are also coupled. Other, optional application servers, of which the server 146 is representative, are also shown in the figure, also connected to the LAN 138. And, wireless hosts 148, directly coupled to the private IP network 14 are further pictured in the figure in connection with the LAN 138.

The DHCP 142 is operable to allocate addresses to wireless hosts, such as the wireless host 32. A WHI value is used as a wireless host address at the DHCP 142. The DNS 144 is operable to store names of the wireless hosts, such as the wireless host 32. The value of the WHI is used as a primary name at the DNS 144, and other secondary names can also be stored in conjunction with the WHI. Exemplary, DNS names include, for instance, WHI24450123456789@org.country; MSISDN467051234567@org.country; and myhost@org.country.

The value of the WHI can be advantageously utilized because such value is a secure, wireless-network-provided identity which unambiguously identifies the wireless subscription used at the wireless host. By storing the value of the WHI as subscriber data at the HLR 76 (shown in FIG. 1), the value of the WHI is stored with an appropriate level of security. As the wireless host accessing the GSM network is authenticated prior to receiving permission to use the WHI stored thereat, no separate log-in is needed to access the private IP network 14.

Transmission between the private IP network 14 and the wireless access router 124 must be secure. To ensure security of the transmission, the wireless host router 124 and the wireless access router forming a portion of the GSM, the wireless access network stores the address and authentication information about the respective routers between which communication is permitted. Such measures ensure that a WHI arriving at the wireless host router 124 is secure and correct. If necessary, transmission between the routers may be encrypted to provide greater assurances of data confidentiality and reliability. Optionally, an authentication procedure at the WHR 124 may be associated to the WHI, thus protecting the IP network from mistakes made in the WHI administration.

WHI and an authentication key may also be received from the wireless host 32, and authentication procedures can additionally be performed at the private IP network prior to granting of permission of the wireless host 32 to access the private IP network.

Access attempts without a valid WHI are rejected by the GGSN. And, valid WHIs must be preconfigured in the WHR 124 as well as the DHCP 142 and DNS 144. The DHCP 142 updates the DNS 144 with the allocated IP address used to address data to be communicated to the wireless host.

While the private IP network 14 shown in FIG. 3 illustrates only a single LAN 138, the network can, instead, be implemented on several physical LANs or implemented on a single platform without a physical LAN. When WHRs analogous to the WHR 124 are present at several physical locations, each WHR is considered as a subnetwork (SHIPN) of the HIPN forming the private IP network. In such an arrangement, each SHIPN is able to communicate with another SHIPN by way of a backbone network.

Figure 4:
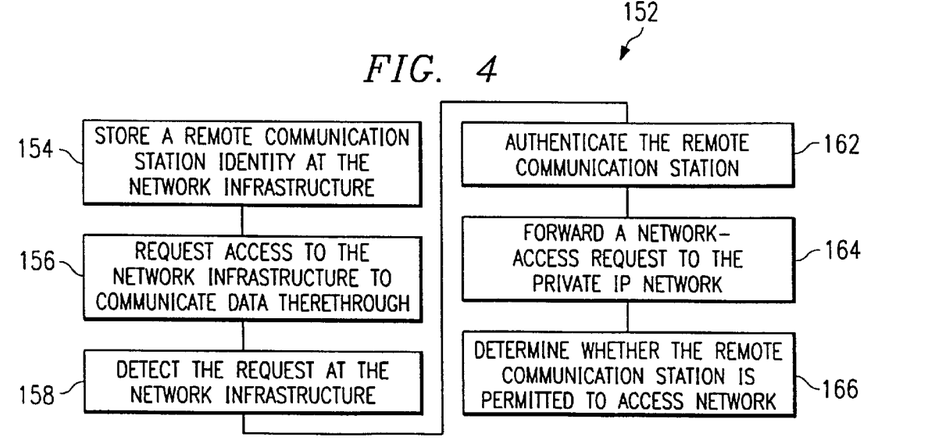
FIG. 4 illustrates a logical flow diagram illustrating the method steps of the method of an embodiment of the present invention.

FIG. 4 illustrates the method, shown generally at 152, of an embodiment of the present invention. The method 152 provides a secured-access method for accessing a private IP network by a remote communication station.

First, and as indicated by the block 154, a remote communication station identity is stored at the network infrastructure forming a wireless access network of a radio communication system. The remote communication station identity is stored together with authentication data associated with the remote communication station.

Then, and as indicated by the block 156, a request is generated by the remote communication station for requesting access to the network infrastructure to permit communication of data therethrough.

The request is detected, as indicated by the block 158, at the network infrastructure. The remote communication station is authenticated, as indicated by the block 162, to confirm authorization of the remote communication station to communicate by way of the network infrastructure.

Thereafter, an IP network-access request is forwarded to the private IP network, as indicated by the block 164. Then, as indicated by the block 166, a determination is made as to whether the remote communication station is permitted to access the private IP network.

And, the remote communication station is permitted to access the private IP network if the remote communication station is determined to be permitted to access the network.

During operation of an embodiment of the present invention permits a wireless host to become a virtual host of a private IP network. A wireless host identity (WHI) is used as a host identifier in the private IP network. The wireless host need only authenticate itself at the private IP network when no contract for safe storage exists between the operators of the wireless access network and the private IP network, regarding security of, e.g., identification information. An authentication procedure confirms the authenticity of the structure transmitting the access request. Bandwidth required over the air interface to generate the request to access the private IP network is advantageously also reduced when transferring IP packets over the air interface as only air-interface-specific protocols are used to transfer IP packets over the air interface.

The previous descriptions are of preferred examples for implementing the invention, and the scope of the invention should not necessarily be limited by this description. The scope of the present invention is defined by the following claims.

What is claimed is:

1. In a method for communicating data between a private data communication network and a remote communication station, the private data communication network coupled to network infrastructure of a radio communication system of which the remote communication station forms a portion, an improvement of a secured-access method of accessing the private data communication network by the remote communication station, said method comprising the steps of:

storing a remote communication station identity which identifies the remote communication station at the network infrastructure;

generating a request by the remote communication station to access the network infrastructure to permit communication of data therethrough;

detecting at the network infrastructure the request generated during said step of generating;

authenticating the remote communication station to confirm authorization of the remote communication station to communicate by way of the network infrastructure;

the remote communication station identity stored together with authentication data associated with the remote communication station;

forwarding a network-access request to the private data communication network if the remote communication station is authenticated during said step of authenticating, the remote communication station identified by the remote communication station identity stored during said step of storing;

determining, responsive to the network-access request forwarded during said step of forwarding, whether the remote communication station is permitted to access the private data communication network; and permitting the remote communication station to access the private data communication network if the remote communication station is determined, during said step of determining, to be permitted to access the private data communication network.

2. In a method for communicating data between a private IP (Internet Protocol) network and a remote communication station, the private IP network coupled to network infrastructure of a radio communication system of which the remote communication station forms a portion, an improvement of a secured-access method of accessing the private IP network by the remote communication station, said method comprising the steps of:

storing a remote communication station identity which identifies the remote communication station at the network infrastructure;

generating a request by the remote communication station to access the network infrastructure to permit communication of data therethrough;

detecting at the network infrastructure the request generated during said step of generating;

authenticating the remote communication station to confirm authorization of the remote communication station to communicate by way of the network infrastructure;

the remote communication station identity stored together with authentication data associated with the remote communication station;

forwarding an IP network-access request to the private IP network if the remote communication station is authenticated during said step of authenticating, the remote communication station identified by the remote communication station identity stored during said step of storing;

determining, responsive to the IP network-access request forwarded during said step of forwarding, whether the remote communication station is permitted to access the private IP network; and permitting the remote communication station to access the private IP network if the remote communication station is determined, during said step of determining, to be permitted to access the private IP network.

3. The method of claim 2 wherein the remote communication station comprises a wireless host coupled to a radio transceiver, the radio transceiver operable to communicate with the network infrastructure, and wherein said step of storing comprises storing a wireless host identity, the wireless host identity associated with the wireless host.

4. The method of claim 3 wherein the wireless host identity is stored at the wireless host.

5. The method of claim 4 wherein the wireless host identity is stored at the radio transceiver.

6. The method of claim 5 wherein the radio transceiver comprises a cellular mobile terminal operable in a cellular communication system, the cellular mobile terminal having a memory card, and wherein the wireless host identity is stored at the memory card.

7. The method of claim 2 wherein the radio communication system comprises a cellular communication system, wherein the remote communication station comprises a wireless host coupled to a radio transceiver and wherein said step of generating the request comprises generating an attach request, the attach request for requesting attachment, by way of a radio link, of the radio transceiver with the network infrastructure of the cellular communication system by way of an air interface formed therebetween.

8. The method of claim 2 wherein the radio communication system comprises a cellular communication system, wherein the data communicated between the remote communication station and the private IP network comprises packet data, and wherein the request generated during said step of generating is provided to a router which routes packet data.

9. The method of claim 8 wherein the cellular communication system comprises a GSM communication system and wherein the router to which the request is provided comprises a SGSN (Servicing GPRS Support Node).

10. The method of claim 2 wherein the radio communication system comprises a cellular communication system, wherein the data communicated between the remote communication station and the private IP network comprises packet-switched data, and wherein the request generated during said step of generating is provided to a router by way of a circuit-switched circuit connection.

11. The method of claim 10 wherein the cellular communication system comprises a GSM communication system and wherein the router to which the request is provided comprises an MSC/VLR (Mobile Switching Center/Visited Location Register).

12. The method of claim 2 wherein said step of storing further comprises the step of storing a private IP network identity identifying the private IP network between which the data is communicated with the remote communication station.

13. In a method for communicating data between a private IP (Internet Protocol) network and a remote communication station, the private IP network coupled to network infrastructure of a radio communication system of which the remote communication station forms a portion, an improvement of a secured-access method of accessing the private IP network by the remote communication station, said method comprising the steps of:

storing a remote communication station identity which identifies the remote communication station at a storage location;

generating a request by the remote communication station to access the network infrastructure to permit communication of data therethrough;

detecting at the network infrastructure the request generated during said step of generating;

authenticating the remote communication station to confirm authorization of the remote communication station to communicate by way of the network infrastructure;

forwarding an IP network-access request to the private IP network if the remote communication station is authenticated during said step of authenticating, the remote communication station identified by the remote communication station identity stored during said step of storing;

determining, responsive to the IP network-access request forwarded during said step of forwarding, whether the remote communication station is permitted to access the private IP network; and permitting the remote communication station to access the private IP network if the remote communication station is determined, during said step of determining, to be permitted to access the private IP network;

wherein said step of storing further comprises the step of storing a private IP network identity identifying the private IP network between which the data is communicated with the remote communication station; and wherein the IP network-access request forwarded during said step of forwarding is forwarded to the private IP network identified by the private IP network identity stored during said step of storing the private IP network identity.

14. In a method for communicating data between a private IP (Internet Protocol) network and a remote communication station, the private IP network coupled to network infrastructure of a radio communication system of which the remote communication station forms a portion, an improvement of a secured-access method of accessing the private IP network by the remote communication station, said method comprising the steps of:

storing a remote communication station identity which identifies the remote communication station at a storage location;

generating a request by the remote communication station to access the network infrastructure to permit communication of data therethrough;

detecting at the network infrastructure the request generated during said step of generating;

authenticating the remote communication station to confirm authorization of the remote communication station to communicate by way of the network infrastructure;

forwarding an IP network-access request to the private IP network if the remote communication station is authenticated during said step of authenticating, the remote communication station identified by the remote communication station identity stored during said step of storing;

determining, responsive to the IP network-access request forwarded during said step of forwarding, whether the remote communication station is permitted to access the private IP network; and permitting the remote communication station to access the private IP network if the remote communication station is determined, during said step of determining, to be permitted to access the private IP network;

wherein said step of storing further comprises the step of storing a private IP network identity identifying the private IP network between which the data is communicated with the remote communication station; and wherein said step of generating further comprises the step of generating a wireless-host-provided, IP network identity, the wireless-host-provided, IP network identity identifying the private IP network between which the data is to be communicated with the remote communication station.

15. The method of claim 14 wherein said step of generating further comprises the step of generating a wireless-host-provided IP network identity, the wireless-host-provided IP network identity identifying the private IP network between which the data is to be communicated with the remote communication station; and wherein the IP network-access request forwarded during said step of forwarding is forwarded to the private IP network identified by the wireless-host-provided IP network identity generated during said step of generating.

16. The method of claim 2 wherein the remote communication station has associated therewith a default-IP network identity and wherein the IP network-access request forwarded during said step of forwarding is forwarded to the private IP network identified by the default-IP network identity.

17. The method of claim 2 wherein said step of determining further comprises the step of authenticating an access request to access the private IP network.

18. The method of claim 2 wherein said step of determining comprises the steps of:

storing at the private IP network a list of remote communication station identities which identify remote communication stations permitted to access the private IP network; and comparing the remote communication station identity associated with the IP network-access request forwarded during said step of forwarding with the remote communication station identities stored upon the list.

19. The method of claim 18 comprising the further step of allocating an address to the remote communication station at the private IP network if the remote communication station is permitted access thereto, the address allocated to the remote communication station for addressing data communicated by the private IP network to the remote communication station.

20. The method of claim 19 wherein the address allocated during said step of allocating comprises a temporary address, the temporary address identifying the remote communication station for a selected period.

21. In a radio communication system having a wireless access network, a private data communication network coupled to the wireless access network, and a remote communication station operable selectively to communicate data with the private data communication network by way of the wireless access network, an improvement of apparatus for selectively permitting access to the private data communication network by the remote communication station, said apparatus comprising:

a storage element at the wireless access network for storing a remote communication station identity identifying the remote communication station;

a detector coupled to the wireless access network, said detector for detecting a request requesting access by the remote communication station to the wireless access network to permit communication of data therethrough;

an authenticator coupled to the wireless access network, said authenticator for confirming authorization of the remote communication station to communicate by way of the wireless access network;

the remote communication station identity stored together with authentication data associated with the remote communication station;

a network access requester coupled to said authenticator, said network access requestor operable responsive to authentication by said authenticator, said network access requester for generating a request to request access to the private data communication network by the remote communication station, the remote communication station identified in the request by the remote communication station identity stored in said storage element; and a determiner associated with the private IP network, said determiner operable responsive to the request requested by said network access requester to determine whether to permit access by the remote communication station to the private data communication network.

22. The apparatus of claim 21 further comprising an address allocator associated with the private IP network, said address allocator for allocating an address to the remote communication station, the address allocated by said address allocator used to address data communicated to the remote communication station by the private IP network.

23. The apparatus of claim 22 wherein said address allocator comprises a dynamic allocator for dynamically allocating a temporary IP address, the temporary IP address used to address the data communicated to the remote communication station for a selected period.

24. The apparatus of claim 21 wherein said storage element further stores a private data communication address identifying the private data communication network.

* * * * *